United States Patent
Hung et al.

(10) Patent No.: US 8,787,045 B1
(45) Date of Patent: Jul. 22, 2014

(54) CONTROL METHOD FOR INHIBITING HARMONIC DISTORTION OF INPUT CURRENT

(71) Applicant: Delta Electronics, Inc., Taoyuan Hsien (TW)

(72) Inventors: Hsien-Feng Hung, Taoyuan Hsien (TW); Yi-Lan Yang, Taoyuan Hsien (TW); Chung-Ping Ku, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 14/051,719

(22) Filed: Oct. 11, 2013

(30) Foreign Application Priority Data

Aug. 9, 2013 (TW) .............................. 102128635 A

(51) Int. Cl.
*H02M 1/12* (2006.01)
*H02M 3/156* (2006.01)

(52) U.S. Cl.
USPC .................. 363/39; 363/44; 363/82; 323/285

(58) Field of Classification Search
USPC ........... 363/39, 44–48, 82; 323/222, 282–290
See application file for complete search history.

(56) References Cited

U.S. PATENT DOCUMENTS

| | | | | |
|---|---|---|---|---|
| 5,181,159 A | * | 1/1993 | Peterson et al. | 363/89 |
| 6,944,034 B1 | * | 9/2005 | Shteynberg et al. | 363/21.13 |
| 7,683,595 B2 | * | 3/2010 | Feldtkeller et al. | 323/282 |
| 8,129,958 B2 | * | 3/2012 | Ku et al. | 323/207 |

* cited by examiner

*Primary Examiner* — Jessica Han
(74) *Attorney, Agent, or Firm* — Kirton McConkie; Evan R. Witt

(57) ABSTRACT

A control method is used in a power factor corrector. Firstly, a current command signal from a computing circuit is received. Then, the current command signal is compared with an input signal of the power conversion circuit, so that a current error signal is generated. If the power factor corrector is operated in a transition interval between the first mode and the second mode, an addition operation is performed on the unadjusted current error signal, a feedforward signal and the adjusted current error signal, thereby generating a current control signal. A switch control signal is generated according to the current control signal. A switching element of a power conversion circuit is controlled according to the switch control signal. Consequently, the harmonic distortion of the input current is inhibited.

10 Claims, 6 Drawing Sheets

US 8,787,045 B1

CONTROL METHOD FOR INHIBITING HARMONIC DISTORTION OF INPUT CURRENT

FIELD OF THE INVENTION

The present invention relates to a control method, and more particularly to a control method of inhibiting harmonic distortion of an input current.

BACKGROUND OF THE INVENTION

Nowadays, the manufacturers of power supply apparatuses make efforts in developing high quality products. For providing sufficient power energy, more and more power plants are constructed. In addition to the increase of power energy, the power factor and the operating efficiency of electronic devices are important factors for achieving power-saving purposes.

A power factor corrector (PFC) is widely used to compensate the phase difference between current and voltage of an electronic device. Consequently, the input voltage and the input current of the electronic device are in phase, and the power factor is improved. In addition, the use of the power factor corrector can inhibit the harmonic wave that is generated by the electronic device and thus increase the quality of the input power.

FIG. 1 is a schematic circuit diagram illustrating a conventional power supply circuit with a power factor corrector. As shown in FIG. 1, the conventional power supply circuit 1 comprises a power conversion circuit 11, a power factor corrector 12, and a pulse-width modulation control circuit 13. The power conversion circuit 11 is used for receiving AC power from a utility AC power source, and rectifying the AC power into an input voltage $V_{in}$. The power factor corrector 12 is used for comparing an output voltage $V_o$ with a reference voltage to perform power factor correction. Consequently, the nearly-sinusoidal shapes of an input current $I_{in}$ and the input voltage $V_{in}$ are in phase. In addition, the power factor corrector 12 issues a current control signal $I_c$ to the pulse-width modulation control circuit 13. According to the current control signal $I_c$, the pulse-width modulation control circuit 13 issues a switch control signal $S_c$ to the power conversion circuit 11. According to the switch control signal $S_c$, the on/off states of a switching element S of the power conversion circuit 11 are controlled. Consequently, the output voltage $V_o$ is outputted from the power conversion circuit 11.

The power factor corrector 12 may be operated in a discontinuous conduction mode (DCM) or a continuous conduction mode (CCM). By the conventional power factor corrector 12, the input current $I_{in}$ and the input voltage $V_{in}$ are in phase, and thus the power factor is enhanced. However, during the transition interval of converting DCM into CCM or converting CCM into DCM, the transient change amount of the current control signal $I_c$ is too large. Correspondingly, the change amount of the duty cycle of the switch control signal $S_c$ from the pulse-width modulation control circuit 13 is too large, and the waveform of the input current $I_c$ is usually suffered from distortion. In particular, during the conversion between DCM and CCM, the waveform of the input current $I_{in}$ has large total harmonic distortion (THD).

FIG. 2 is a schematic timing waveform diagram of the input current processed by the power supply circuit of FIG. 1. As shown in FIG. 2, at the peak and the trough of the input current $I_{in}$, the total harmonic distortion (THD) is very high. For example, the total harmonic distortion factor is up to 6.6 (i.e. iTHD 6.6). Due to the large THD factor of the input current $I_{in}$, the quality of the input current is deteriorated.

Therefore, there is a need of providing an improved control method of inhibiting harmonic distortion of an input current in order to avoid the above drawbacks.

SUMMARY OF THE INVENTION

The present invention provides a control method of inhibiting harmonic distortion of an input current. When the power factor corrector is operated in a transition interval between DCM and CCM, the harmonic distortion of the input current of the power conversion circuit is largely inhibited, and the quality of the input power is enhanced.

In accordance with an aspect of the present invention, there is provided a control method of inhibiting harmonic distortion of an input current for use in a power factor corrector. The power factor corrector is connected with a power conversion circuit, and includes a computing circuit. The power factor corrector is operated in a first mode or a second mode. Firstly, a current command signal from the computing circuit is received. Then, the current command signal is compared with an input signal of the power conversion circuit, so that a current error signal is generated. If the power factor corrector is operated in a transition interval between the first mode and the second mode, an addition operation is performed on the unadjusted current error signal, a feedforward signal and the adjusted current error signal, thereby generating a current control signal. A switch control signal is generated according to the current control signal. A switching element of the power conversion circuit is controlled according to the switch control signal. Consequently, the harmonic distortion of the input current is inhibited.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
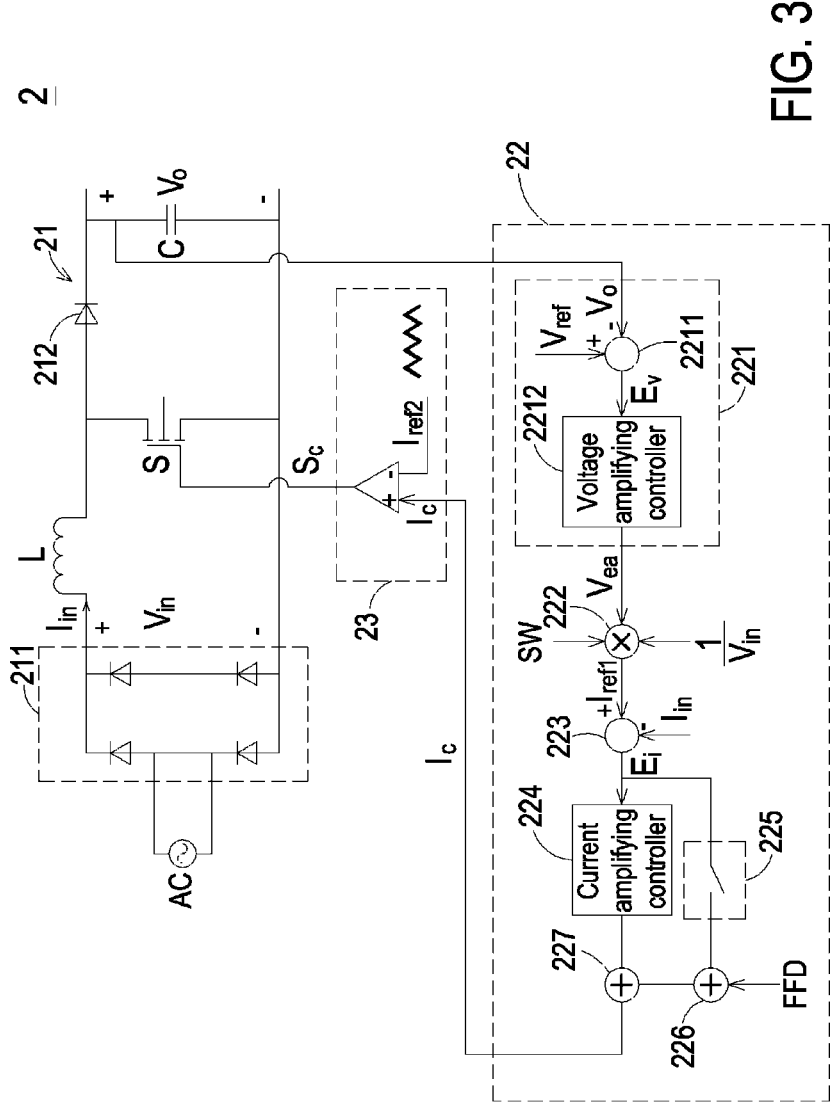
FIG. 3 is a schematic circuit diagram illustrating a power supply circuit according to an embodiment of the present invention.

FIG. 3 is a schematic circuit diagram illustrating a power supply circuit according to an embodiment of the present invention. As shown in FIG. 3, the power supply circuit 2 comprises a power conversion circuit 21, a power factor corrector 22, and a switch control circuit 23. After AC power from a utility AC power source is received by the power conversion circuit 21, the AC power is rectified into an input voltage $V_{in}$ by a rectifier circuit 211. The power factor corrector 22 is used for comparing an output voltage $V_o$ with a reference voltage $V_{ref}$ to perform power factor correction. Consequently, the nearly-sinusoidal shapes of an input current $I_{in}$ and the input voltage $V_{in}$ are in phase. In addition, the power factor corrector 22 issues a current control signal $I_c$ to the switch control circuit 23. According to the current control signal $I_c$, the switch control circuit 23 issues a switch control signal $S_c$ to the power conversion circuit 21. According to the switch control signal $S_c$, the on/off states of a switching element S of the power conversion circuit 21 are controlled. Consequently, the output voltage $V_o$ is outputted from the power conversion circuit 21.

Please refer to FIG. 3 again. The power conversion circuit 21 comprises the rectifier circuit 211, an inductor L, the switching element S, a diode 212, and a capacitor C. By controlling the on/off states of the switching element S, the output voltage $V_o$ is outputted from the power conversion circuit 21.

Figure 4:
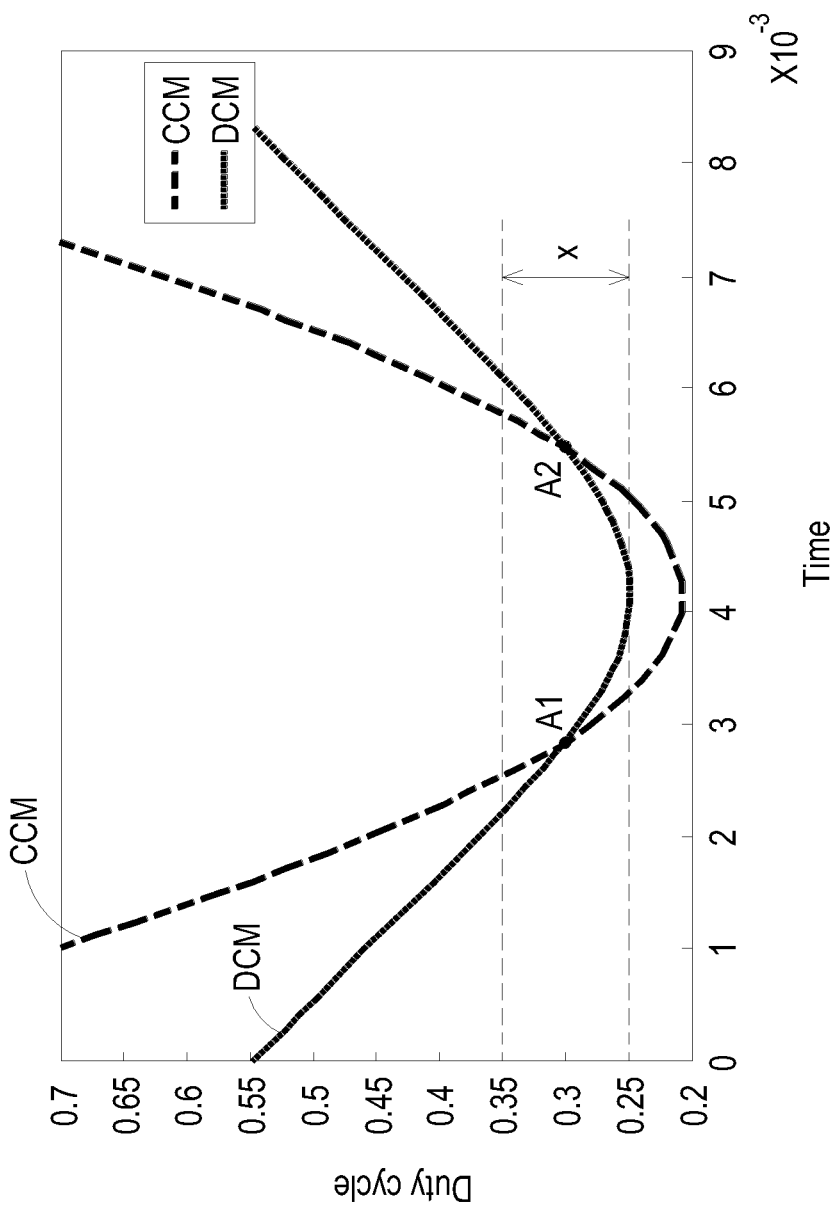
FIG. 4 is a plot illustrating the duty cycle for the power factor corrector of FIG. 3 in a first mode or a second mode.

FIG. 4 is a plot illustrating the duty cycle for the power factor corrector of FIG. 3 in a first mode or a second mode. In accordance with the present invention, the power factor corrector 22 may be operated in a first mode or a second mode. The first mode is a discontinuous conduction mode (DCM), and the second mode is a continuous conduction mode (CCM). There are two transition points A1 and A2 between the first mode (DCM) and the second mode (CCM). In this embodiment, the power factor corrector 22 is operated in the first mode (DCM) from the zero time point and the transition point A1; the operating mode of the power factor corrector 22 is switched from the first mode (DCM) to the second mode (CCM) after the transition point A1; and the operating mode of the power factor corrector 22 is switched from the second mode (CCM) to the first mode (DCM) after the transition point A2. The transition interval X is determined by a microcontroller (not shown) according to the two transition points A1 and A2. For example, in case that the duty cycle corresponding to the transition points A1 and A2 is 0.3, the transition interval X is set as 0.3±0.05. That is, the transition interval X is in the range between 0.25 and 0.35.

The power factor corrector 22 comprises a voltage feedback circuit 221, a computing circuit 222, a comparator 223, a current amplifying controller 224, a switching element 225, and two adders 226 and 227. The voltage feedback circuit 221 comprises a comparator 2211 and a voltage amplifying controller 2212. The comparator 2211 is electrically connected with the power conversion circuit 21 and the voltage amplifying controller 2212. By comparing the output voltage $V_o$ of the power conversion circuit 21 with the reference voltage $V_{ref}$, the comparator 2211 generates a voltage error signal $E_v$. By the voltage amplifying controller 2212, the voltage error signal $E_v$ is amplified as a voltage command signal $V_{ea}$. In this embodiment, the voltage amplifying controller 2212 is a compensating circuit such as a proportional-integral controller (PI controller).

The voltage command signal $V_{ea}$ is transmitted to the computing circuit 222. By performing a multiplication on the voltage command signal $V_{ea}$, a sinusoidal signal SW and an inversion signal of the input voltage $V_{in}$ (i.e. $1/V_{in}$), the computing circuit 222 generates a current command signal $I_{ref1}$. The comparator 223 is electrically connected with the computing circuit 222, the current amplifying controller 224 and the switching element 225. By comparing the current command signal $I_{ref1}$ with an input current $I_{in}$, the comparator 223 generates a current error signal $E_1$. By the current amplifying controller 224, the current error signal $E_i$ is amplified. In this embodiment, the current amplifying controller 224 is a compensating circuit such as a proportional-integral controller (PI controller).

The operations of the switching element 225 are controlled by the microcontroller (not shown). In case that the power factor corrector 22 is operated in the transition interval X between the first mode (DCM) and the second mode (CCM) as shown in FIG. 4, the switching element 225 is conducted. Under this circumstance, the adder 226 performs an addition operation on the unadjusted current error signal $E_i$ and a feedforward signal FFD. Then, the computation result of the adder 226 and the adjusted current error signal $E_i$ from the current amplifying controller 224 are added by the adder 227. Consequently, the current control signal is generated.

On the other hand, if the power factor corrector 22 is not operated in the transition interval X, the switching element 225 is shut off. Under this circumstance, by performing an addition operation on the adjusted current error signal $E_i$ and the feedforward signal FFD, the adder 227 generates the current control signal $I_c$.

In an embodiment, the minimum duty cycle between the duty cycle of the first mode (DCM) and the duty cycle of the second mode (CCM) corresponding to the same time point is defined as the feedforward signal FFD. That is, FFD Min (DCM, CCM). Please refer to FIG. 4 again. Since the duty cycle of the first mode (DCM) is smaller than the duty cycle of the second mode (CCM) from the zero time point and the transition point A1, the power factor corrector 22 is operated in the first mode (DCM), and the feedforward signal FFD is equal to the duty cycle of the first mode (DCM). Moreover, since the duty cycle of the second mode (CCM) is smaller than the duty cycle of the first mode (DCM) between the transition points A1 and A2, the operating mode of the power factor corrector 22 is switched from the first mode (DCM) to the second mode (CCM), and the feedforward signal FFD is equal to the duty cycle of the second mode (CCM). Since the duty cycle of the first mode (DCM) is smaller than the duty cycle of the second mode (CCM) after the transition point A2, the operating mode of the power factor corrector 22 is switched from the second mode (CCM) to the first mode (DCM), and the feedforward signal FFD is equal to the duty cycle of the first mode (DCM).

Please refer to FIG. 3 again. The switch control circuit 23 is electrically connected with the switching element S of the power conversion circuit 21 and the adder 227 of the power factor corrector 22. According to the current control signal $I_c$ and a reference signal $I_{ref2}$, the switch control circuit 23 generates the switch control signal $S_c$. According to the switch control signal $S_c$, the on/off states of a switching element S of the power conversion circuit 21 are controlled. Consequently, the stable output voltage $V_o$ is generated. Moreover, in case that the power factor corrector 22 is operated in the transition interval X between the first mode (DCM) and the second mode (CCM) as shown in FIG. 4, the unadjusted current error signal $E_i$, the feedforward signal FFD and the adjusted current error signal $E_i$ are added. Consequently, the change amount of the current control signal $I_c$ in the transition interval X is reduced, and the change amount of the duty cycle of the switch control signal $S_c$ from the switch control circuit 23 is reduced. Under this circumstance, the harmonic distortion of the input current of the power conversion circuit 21 is largely inhibited. In an embodiment, the switch control circuit 23 is a pulse-width modulation control circuit, and the reference signal $I_{ref2}$ is a triangle wave signal.

Figure 1:
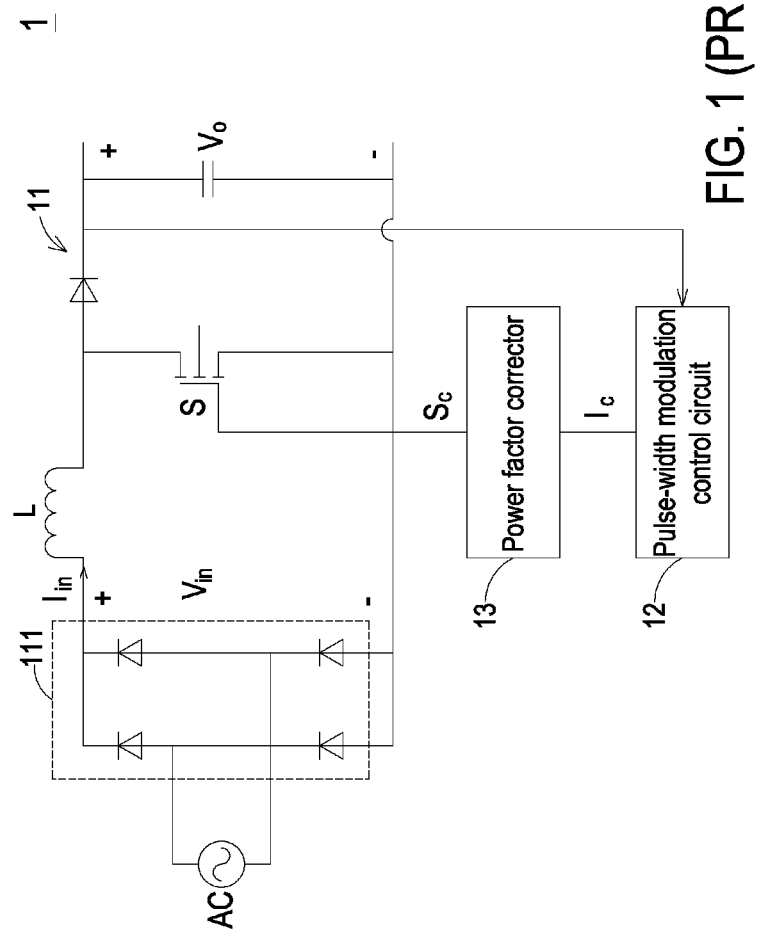
FIG. 1 is a schematic circuit diagram illustrating a conventional power supply circuit with a power factor corrector.
Figure 2:
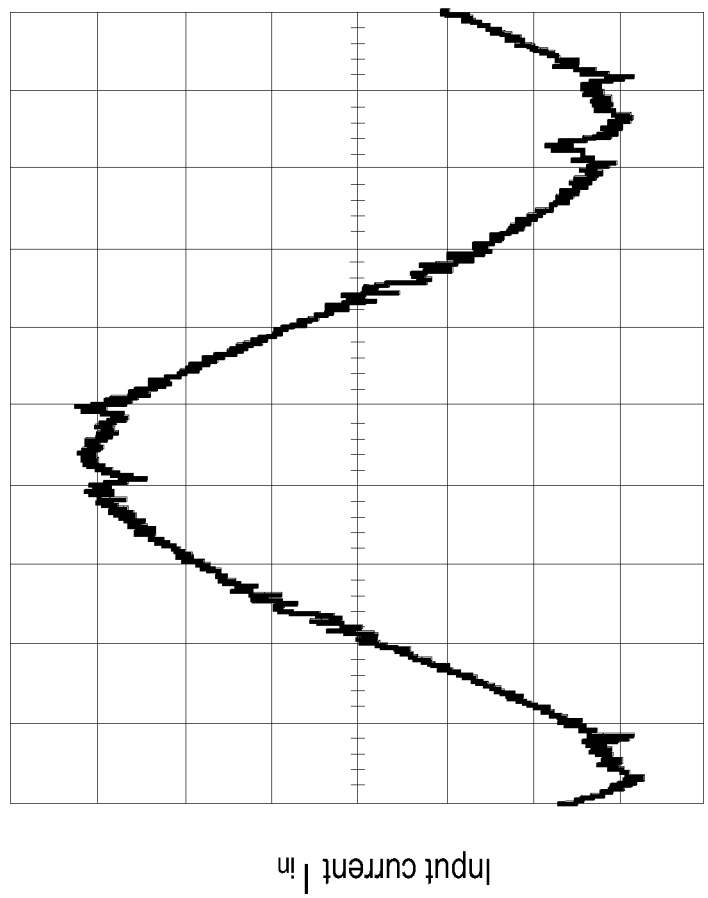
FIG. 2 is a schematic timing waveform diagram of the input current processed by the power supply circuit of FIG. 1.
Figure 5:
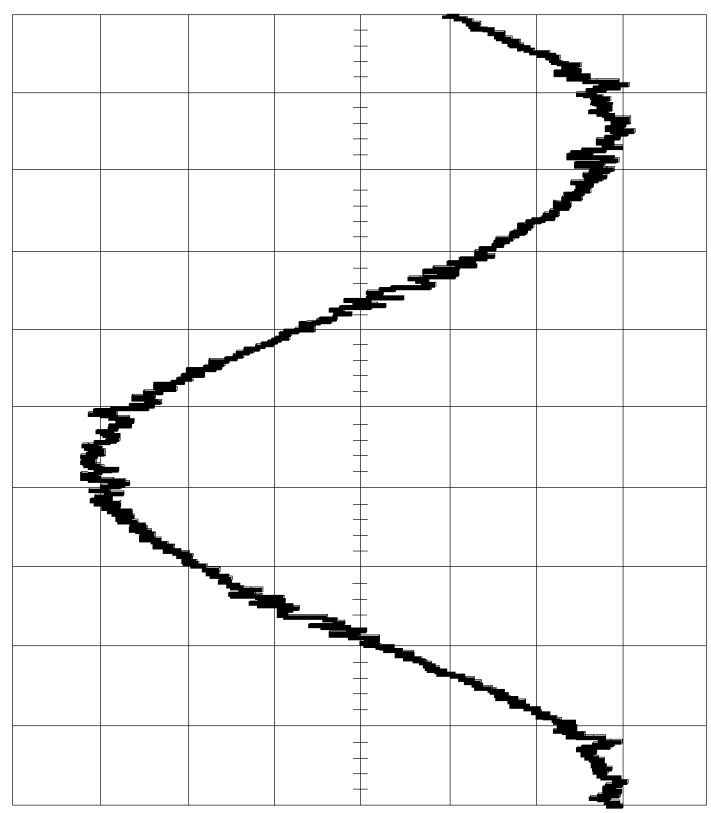
FIG. 5 is a schematic timing waveform diagram of the input current processed by the power supply circuit of FIG. 3.

FIG. 5 is a schematic timing waveform diagram of the input current processed by the power supply circuit of FIG. 3. As shown in FIG. 5, at the peak and the trough of the input current $I_{in}$ the total harmonic distortion (THD) is effectively inhibited. In comparison with FIG. 2, the total harmonic distortion factor is reduced to 4.4 (i.e. iTHD 4.4). In other words, the quality of the input power is improved. During the transition interval X, the transient change amount of the current control signal $I_c$ is small, and the problem of causing the harmonic distortion of the input current $I_{in}$ is avoided.

Figure 6:
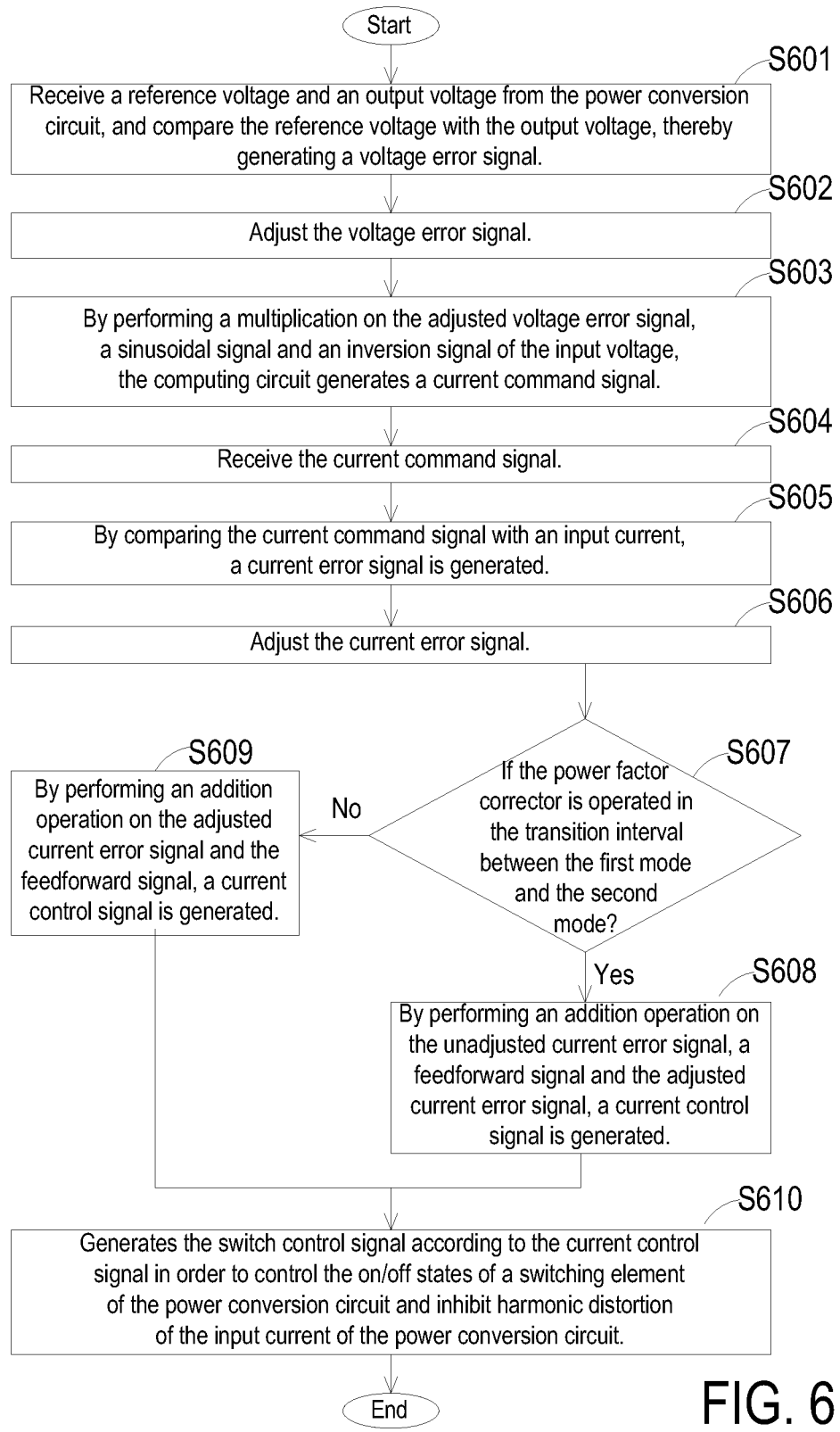
FIG. 6 is a flowchart illustrating a control method of inhibiting harmonic distortion of an input current according to an embodiment of the present invention.

FIG. 6 is a flowchart illustrating a control method of inhibiting harmonic distortion of an input current according to an embodiment of the present invention. Please refer to FIGS. 3, 4 and 6. The control method of inhibiting harmonic distortion of an input current comprises the following steps.

Firstly, a reference voltage $V_{ref}$ and an output voltage $V_o$ from the power conversion circuit 21 are received, and the reference voltage $V_{ref}$ and the output voltage $V_o$ are compared with each other, so that a voltage error signal $E_v$ is generated (Step S601). Then, the voltage error signal $E_v$ is amplified as a voltage command signal $V_{ea}$ by the voltage amplifying controller 2212 (Step S602). By performing a multiplication on the adjusted voltage error signal $E_v$ (i.e. the voltage command signal $V_{ea}$), a sinusoidal signal SW and an inversion signal of the input voltage $V_{in}$ (i.e. $1/V_{in}$), the computing circuit 222 generates a current command signal $I_{ref1}$ (Step S603).

Then, the current command signal $I_{ref1}$ is received by the comparator 223 (Step S604). By comparing the current command signal $I_{ref1}$ with an input current $I_{in}$, the comparator 223 generates a current error signal $E_i$ (Step S605). Then, the current error signal is adjusted (e.g. amplified) (Step S606). Then, a step S607 is performed to judge whether the power factor corrector 22 is operated in the transition interval X between the first mode (DCM) and the second mode (CCM).

If the judging condition of the step S607 is satisfied, it means that the power factor corrector 22 is operated in the transition interval X between the first mode (DCM) and the second mode (CCM). Under this circumstance, the switching element 225 is conducted. The adder 226 performs an addition operation on the unadjusted current error signal $E_i$ and a feedforward signal FFD, and the computation result of the adder 226 and the adjusted current error signal $E_i$ from the current amplifying controller 224 are added by the adder 227, so that a current control signal $I_c$ is generated (Step S608).

On the other hand, if the judging condition of the step S607 is not satisfied, it means that the power factor corrector 22 is not operated in the transition interval X. Under this circumstance, by performing an addition operation on the adjusted current error signal $E_i$ and the feedforward signal FFD, the adder 227 generates the current control signal $I_c$ (Step S609).

Afterwards, the switch control circuit 23 generates a switch control signal $S_c$ according to the current control signal $I_c$ and a reference signal $I_{ref2}$, and the on/off states of a switching element S of the power conversion circuit 21 are controlled according to the switch control signal $S_c$, so that a stable output voltage $V_o$ is generated (Step S610). Moreover, in case that the power factor corrector 22 is operated in the transition interval X between the first mode (DCM) and the second mode (CCM) as shown in FIG. 4, the unadjusted current error signal $E_i$, the feedforward signal FFD and the adjusted current error signal $E_i$ are added. Consequently, the change amount of the current control signal $I_c$ in the transition interval X is reduced, and the change amount of the duty cycle of the switch control signal $S_c$ from the switch control circuit 23 is reduced. Under this circumstance, the harmonic distortion of the input current $I_{in}$ of the power conversion circuit 21 is largely inhibited.

From the above descriptions, the present invention provides a control method of inhibiting harmonic distortion of an input current. In case that the power factor corrector is operated in the transition interval between the first mode and the second mode, an addition operation is performed on the unadjusted current error signal, the feedforward signal and the adjusted current error signal. Consequently, the change amount of the generated current control signal in the transition interval is reduced, and the change amount of the duty cycle of the switch control signal from the switch control circuit is reduced. Under this circumstance, the harmonic distortion of the input current of the power conversion circuit is largely inhibited.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of inhibiting harmonic distortion of an input current for use in a power factor corrector, the power factor corrector being connected with a power conversion circuit and comprising a computing circuit, the power factor corrector being operated in a first mode or a second mode, the control method comprising at least steps of:
    (a) receiving a current command signal from the computing circuit;
    (b) comparing the current command signal with an input signal of the power conversion circuit, thereby generating a current error signal;
    (c) adjusting the current error signal;
    (d) judging whether the power factor corrector is operated in a transition interval between the first mode and the second mode, wherein if the judging condition is satisfied, an addition operation is performed on the unadjusted current error signal, a feedforward signal and the adjusted current error signal, thereby generating a current control signal; and
    (e) generating a switch control signal according to the current control signal, and controlling a switching element of the power conversion circuit according to the switch control signal, thereby inhibiting harmonic distortion of the input current.

2. The control method according to claim 1, wherein the power factor corrector is electrically connected with a switch control circuit, wherein the switch control circuit generates the switch control signal according to the current control signal and a reference signal.

3. The control method according to claim 1, wherein the step (c) of adjusting the current error signal is performed by amplifying the current error signal.

4. The control method according to claim 1, wherein the first mode is a discontinuous conduction mode, and the second mode is a continuous conduction mode.

5. The control method according to claim 4, wherein the minimum duty cycle between a duty cycle of the first mode and a duty cycle of the second mode is defined as the feedforward signal.

6. The control method according to claim 1, wherein the step (a) comprises a sub-step (a1) of receiving a reference voltage and an output voltage from the power conversion circuit and comparing the reference voltage with the output voltage, thereby generating a voltage error signal.

7. The control method according to claim 6, wherein the step (a) further comprises a sub-step (a2) of adjusting the voltage error signal.

8. The control method according to claim 7, wherein the step (a) further comprises a sub-step (a3) of allowing the computing circuit to perform a multiplication on the voltage command signal, a sinusoidal signal and an inversion signal of the input voltage, thereby generating the current command signal.

9. The control method according to claim 7, wherein the sub-step (a2) of adjusting the voltage error signal is performed by amplifying the voltage error signal.

10. The control method according to claim 1, wherein if the judging condition in the step (b) is not satisfied, an addition operation is performed on the feedforward signal and the adjusted current error signal, thereby generating the current control signal.

* * * * *